A. E. MOORHEAD.
CAP VALVE.
APPLICATION FILED OCT. 28, 1908.

927,808.

Patented July 13, 1909.

WITNESSES:
F. C. Fliedner
Nellie B. Keating

INVENTOR,
Albert E. Moorhead
BY
F. M. Wright
ATTORNEY.

UNITED STATES PATENT OFFICE.

ALBERT E. MOORHEAD, OF SAN FRANCISCO, CALIFORNIA.

CAP-VALVE.

No. 927,808.  Specification of Letters Patent.  Patented July 13, 1909.

Application filed October 28, 1908.  Serial No. 459,947.

*To all whom it may concern:*

Be it known that I, ALBERT E. MOORHEAD, a citizen of the United States, residing at San Francisco, in the county of San Francisco and State of California, have invented new and useful Improvements in Cap-Valves, of which the following is a specification.

This invention relates to a combination pressure and vacuum valve, especially adapted for use with pneumatic cleansing apparatus in buildings.

For such apparatus stationary pipes in the building are connected to flexible hose pipes which at their other ends are connected to movable implements such as pneumatic sweepers. Air is generally drawn by suction through said implements and hose into the stationary pipes, but it is sometimes desirable to force compressed air into the pipes and through the hose.

The object of the present invention is to provide a valve for the ends of the stationary pipes which will be convenient, easy, and rapid of manipulation.

Figure 1:
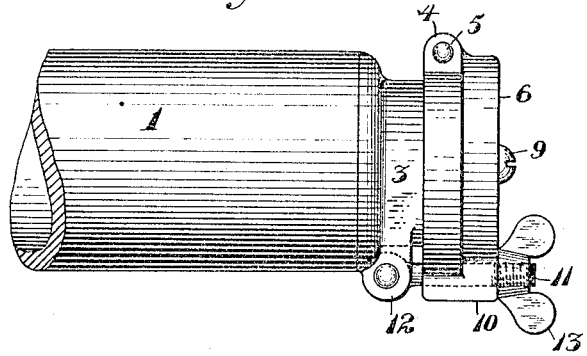
Figure 2:
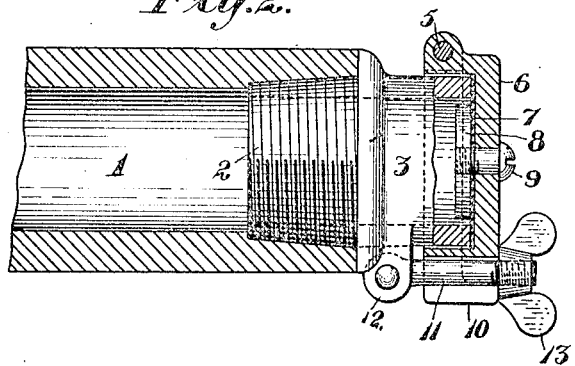
Figure 3:
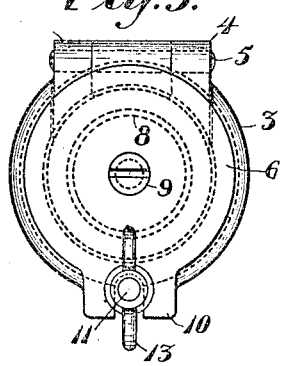

In the accompanying drawing, Figure 1 is a side view of the valve, and a part of a pipe to which it is connected; Fig. 2 is a sectional view of the valve, showing in side elevation the coupling upon which the valve is mounted; Fig. 3 is an end view of the valve.

Referring to the drawing, 1 indicates a portion of a fixed pipe to which the valve is connected. Into the ends of said pipe is screwed a tapered threaded end 2 of a coupling 3. On the end of said coupling are formed lugs 4 through which passes a pivot pin 5 by which is pivoted a cap valve 6. On the inner side of said cap valve is placed a gasket 7 of soft rubber, held in place by a disk 8 of metal secured in place by a central screw 9. Said gasket 7 abuts against the outer end of the coupling and forms a tight joint thereagainst. The lower side of the cap valve, opposite to the pivot, is formed with a forked extension 10 into which can pass a hinge bolt 11 pivoted between lugs 12 depending from the coupling. Upon the threaded outer end of said hinge bolt is screwed a wing nut 13.

When it is desired to attach a hose pipe to the stationary pipe, the wing nut is unscrewed to permit the bolt to drop, and the cap valve is then swung upward and the end of the hose inserted. But, when closed, the wing nut can hold the cap valve very firmly to its seat, so that, if compressed air be forced through the pipes in the building no leakage can take place at the ends of those pipes which are not connected to hose pipes but are closed by these cap valves.

I claim:—

In an apparatus of the character described, in combination with a pipe, a coupling screwed to the end of said pipe, a cap valve pivoted on one side of the outer end of the coupling, a hinge bolt pivoted on the opposite side thereof, the cap valve being forked on said opposite side to receive said hinge bolt, a nut on the threaded outer end of the hinge bolt, and a flexible gasket on the inside of said cap valve, adapted to abut against the outer end of the coupling, substantially as described.

In testimony whereof I have hereunto set my hand in the presence of two subscribing witnesses.

ALBERT E. MOORHEAD.

Witnesses:
FRANCIS M. WRIGHT,
D. B. RICHARDS.